United States Patent [19]
Yoshino et al.

[11] Patent Number: 5,222,019
[45] Date of Patent: Jun. 22, 1993

[54] FINANCIAL CALCULATOR CAPABLE OF DISPLAYING GRAPHIC REPRESENTATION

[75] Inventors: Hiroyuki Yoshino; Yoshinori Tomidokoro, both of Tokyo, Japan

[73] Assignee: Casio Computer Co., Ltd., Tokyo, Japan

[21] Appl. No.: 770,634

[22] Filed: Oct. 3, 1991

Related U.S. Application Data

[62] Division of Ser. No. 292,379, Dec. 30, 1988.

[30] Foreign Application Priority Data

Jan. 6, 1988 [JP] Japan .......................... 63-818
Mar. 17, 1988 [JP] Japan ..................... 63-34462[U]
Mar. 17, 1988 [JP] Japan ..................... 63-34463[U]

[51] Int. Cl.⁵ .............................................. G06F 15/30
[52] U.S. Cl. ........................................ 364/408; 364/401
[58] Field of Search ................................ 364/401, 408

[56] References Cited

U.S. PATENT DOCUMENTS 3,863,060 1/1975 Rode et al. ........................... 235/156
3,946,218 3/1976 Rode et al. ........................... 235/156
4,232,367 11/1980 Youden et al. ....................... 364/408

OTHER PUBLICATIONS

*Using Lotus* 1-2-3, 1987, pp. 359-360.
"GMAC Mortgage Amortization Schedule".
"Ficales", Computer Language, vol. 4, No. 1, p.83, Jan. 1987, Tim Parker.
"HP Compound Interest and Loan Amortization", Product Literature, AN 83-003530 . . . File of Orbit.

*Primary Examiner*—Gail Hayes
*Attorney, Agent, or Firm*—Frishauf, Holtz, Goodman & Woodward

[57] ABSTRACT

In a financial calculator, a graphic representation function is provided, and financial values desired for an operator are calculated based upon various input financial data. Also, both the entered data and calculated values are displayed as a graphic representation. In the graphic representation, a display interval of a pattern is determined based upon the number of the display data, and a magnitude of the pattern is determined based on the magnitude of the data value.

9 Claims, 16 Drawing Sheets

|  | POSITIVE DIRECTION | | | NEGATIVE DIRECTION | | |
| --- | --- | --- | --- | --- | --- | --- |
|  | S | M | L | S | M | L |
| PV | ↑ | ↑ | ↑ | ↓ | ↓ | ↓ |
| FV | ↑ | ↑ | ↑ | ↓ | ↓ | ↓ |
| PMT | ↑ | ↑ | ↑ | ↓ | ↓ | ↓ |

FIG. 6

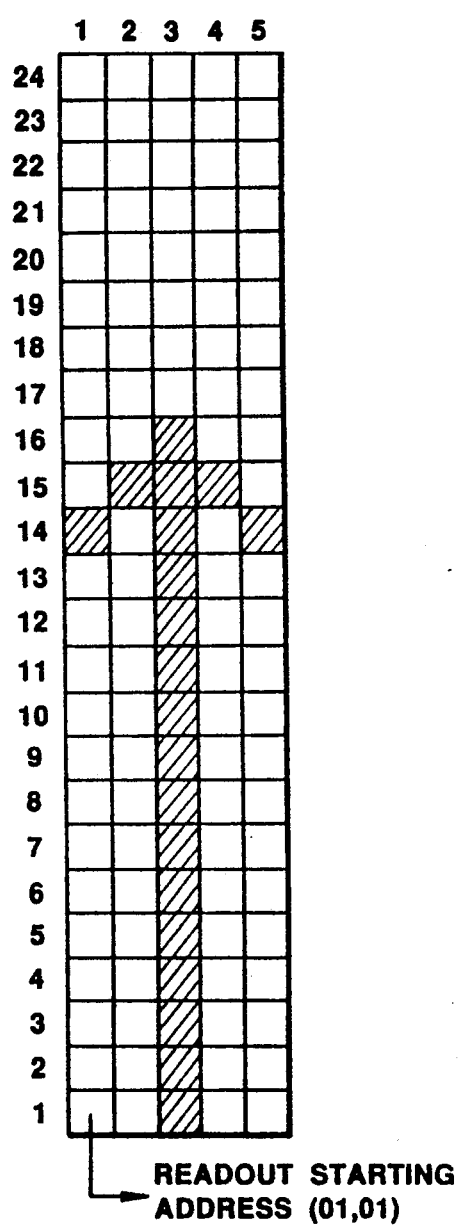
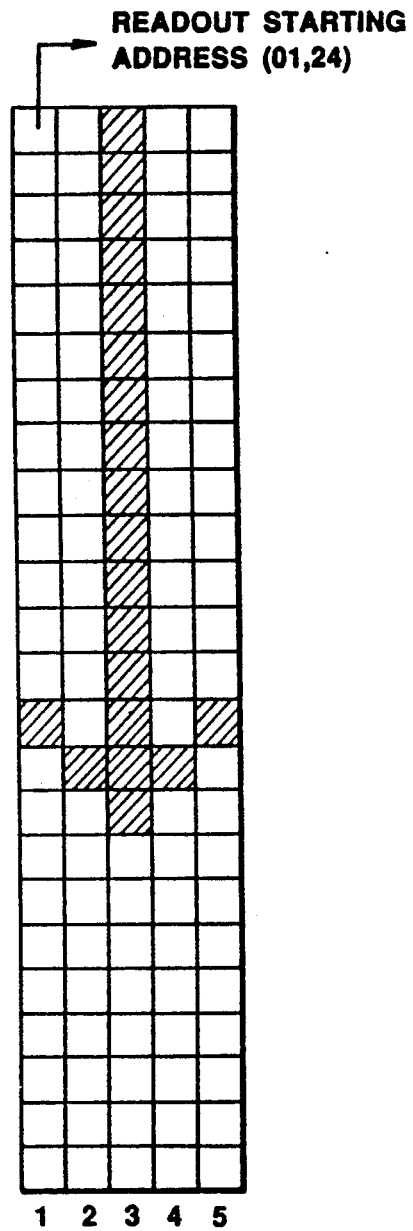
FIG. 7A  FIG. 7B

FIG. 8A

MENU

* FIN MENU    1
1 SIMPLE   INT.
2 COMPOUND   INT.
3 COM.INT.MONTHLY
4 BOND
5 D. C. F.

| 1 | 2 | 3 | 4 | 5 |
|---|---|---|---|---|
| F1 | F2 | F3 | F4 | F5 |

* COMPOUND   INT.
 n ? 0.
 I% ? 0.
 PV ? 0.
PMT ? 0.
 FV ? 0.

| n | I% | PV | PMT | FV |

FV ? 0.
 n = 7.
 I% = 4.
 PV = -100000.
PMT = -10000.

| n | I% | PV | PMT | FV |

```
n = 7.
I% = 4.
PV = -100000.
PMT = -10000.
FV = 170535.
```

| n | I% | PV | PMT | FV |

GRAPH

PV — PMT — HORIZONTAL AXIS — FV

TRACE

PV = -100000.

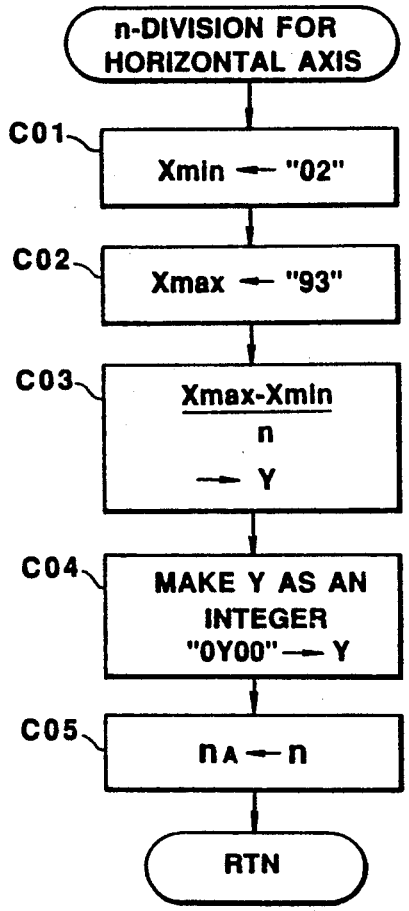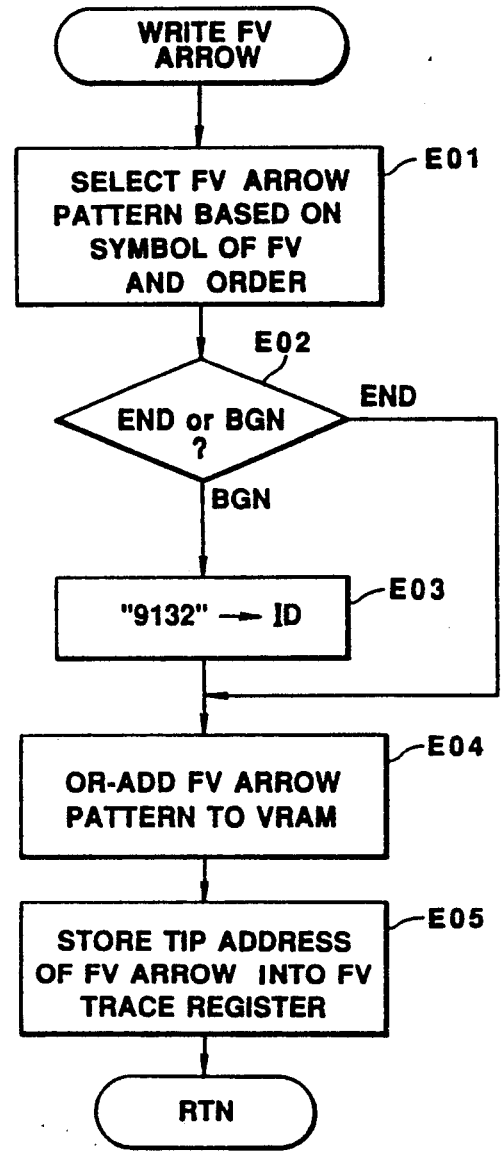
FIG. 11　　　FIG. 13

| | | |
|---|---:|---:|
| CF0 | -860 | 1 |
| CF1 | -50 | 1 |
| CF2 | 420 | 1 |
| CF3 | 310 | 2 |
| CF4 | 240 | 1 |
| CF5 | 230 | 1 |
| CF6 | 260 | 1 |
| ⋮ | | |
| CF29 | | |
FIG.18
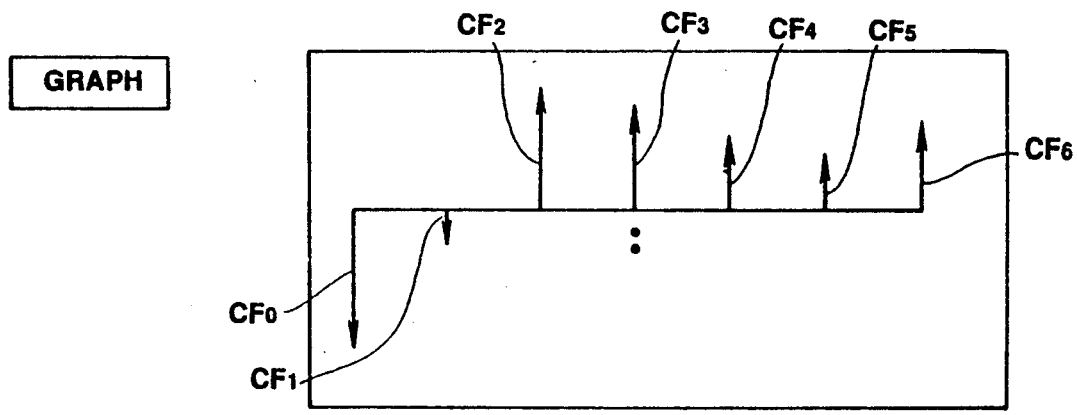
FIG.20
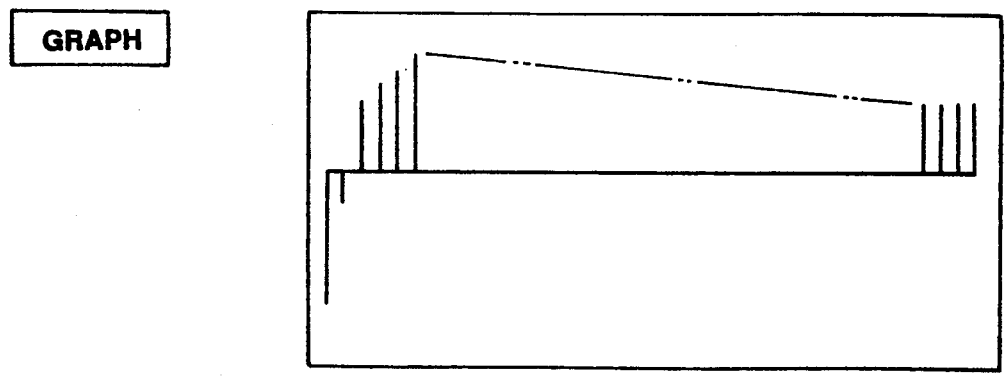
FIG.21

FINANCIAL CALCULATOR CAPABLE OF DISPLAYING GRAPHIC REPRESENTATION

This is a division of application Ser. No. 07/292,379, filed Dec. 30, 1988.

BACKGROUND OF THE INVENTION

1. Field of the Invention

The present invention relates to a financial calculator having a graphic representation function capable of displaying a flow of financial data obtained by financial calculations in a graphic representation.

2. Description of the Related Art

In conventional compact electronic calculators having financial calculating functions, numerical values of various financial data obtained are merely displayed on the display unit thereof.

When an amount with interest added is, for instance, calculated by way of a compound interest calculation, various data such as the principal, payment, interest, and number of payment are entered, and thus calculation results of the amount with interest added are displayed on the display unit by way of numerical values. In these conventional financial calculators, since the various entered data have been stored in the memories thereof, these data can be read out therefrom by operating various keys to display numerical values, which can be confirmed by an operator.

However, a degree of the various data, differences of payment/refund, and number of payment cannot be grasped as a whole by merely reading out these data and displaying them on the display unit. That is to say, a total flow of the financial data cannot be sufficiently observed by merely displaying these data by use of numerical values.

As a consequence, the relationships of the various financial data must be manually written on paper to grasp the flows of the financial data, which causes a cumbersome task for an operator.

SUMMARY OF THE INVENTION

The present invention has been made in an attempt to solve the conventional problems, and therefore an object is to provide a novel financial calculator having a graphic representative function by which a flow of financial data on the financial calculations is graphically represented and can be observationally grasped.

A financial calculator having a graphic representative function according to the present invention, comprises:

an entry unit for entering various financial data;
a memory unit for storing the entered financial data;
a calculation unit for calculating financial information derived from the financial data stored in the memory unit;
a processing unit for graphically representing a relationship between payment and refund based upon at least one of the financial data stored in the memory unit and the financial information calculated by the calculation unit, the processing unit including a pattern size determining section for determining a degree of a pattern based upon the amounts of payment/refund, and a display interval determining section for determining a display interval of the patterns based on a number of data to be displayed; and, a display unit for displaying the patterns obtained by the processing unit at the determined interval.

BRIEF DESCRIPTION OF THE DRAWINGS

For a better understanding of the invention, reference is made to the following description in conjunction with the accompanying drawings: in which:

FIG. 6 is a representation of various types of arrow patterns displayed on the display unit of the financial calculator;

FIGS. 7A and 7B are detailed representations of various types of arrow patterns;

FIGS. 8A to 8F represent various display conditions in response to key operations;

FIG. 11 is a flow chart of explaining a writing operation of horizontal axis patterns;

FIG. 13 is a flow chart of representing a writing operation of FV arrow patterns;

FIG. 18 schematically illustrates data contents of CF data areas;

FIGS. 20 and 21 illustrate graphic display conditions of the investment appraisal.

DETAILED DESCRIPTION OF THE PREFERRED EMBODIMENT

OVERALL FUNCTIONS OF FINANCIAL CALCULATOR

Figure 1:
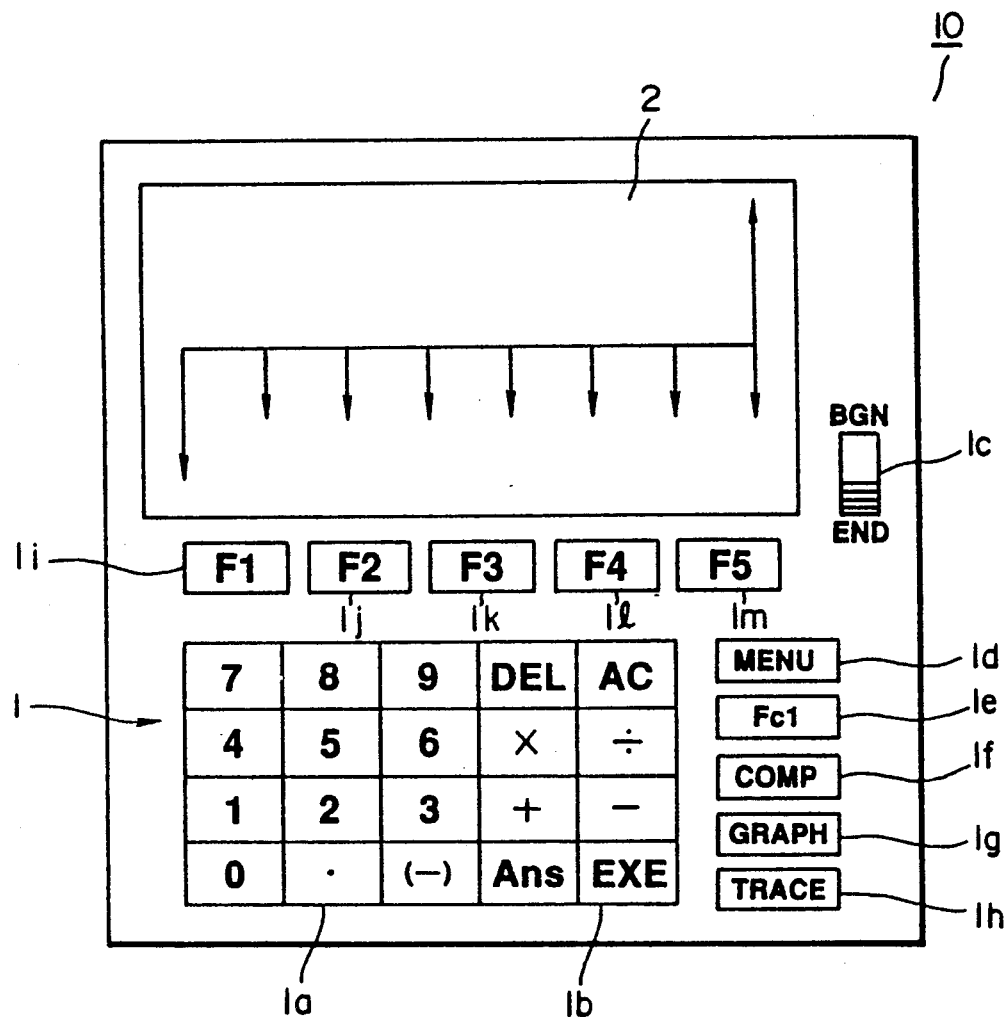
FIG. 1 is a plan view of a financial calculator according to a preferred embodiment of the invention.

In FIG. 1, there is shown a financial calculator 10 having a graphic representation function into which the present invention has been applied. A key entry unit 1 includes a ten key arrangement 1a for entering numerical values into the financial calculator 10; a calculation key 1b; a mode switch 1c for designating either a beginning of term payment (referred to as a "BGN"), or an ending of term payment (referred to as an "END") on the financial calculation; a MENU key 1d for displaying menus of various financial calculations; an Fc1 key 1e for clearing memories wholly into which the financial data have been stored; a COMP key 1f for designating beginning of a financial calculation; a GRAPH key 1g for displaying a financial graph; and a TRACE key 1h for sequentially tracing a numerical value of financial data which has been graphic-represented and displaying the traced value. Also, function keys (F1 to F5) 1*i* to 1*m* for designating the functions to be displayed on a display unit 2 (will be discussed later) are arranged in one line under the display unit 2.

The display unit 2 is constructed of a dot matrix type liquid crystal display unit, in which 96 dot display elements are arranged in an X direction of this display unit 2, whereas 64 dot display elements are arranged in the Y direction thereof.

Circuit Arrangement of Financial Calculator

Figure 2:
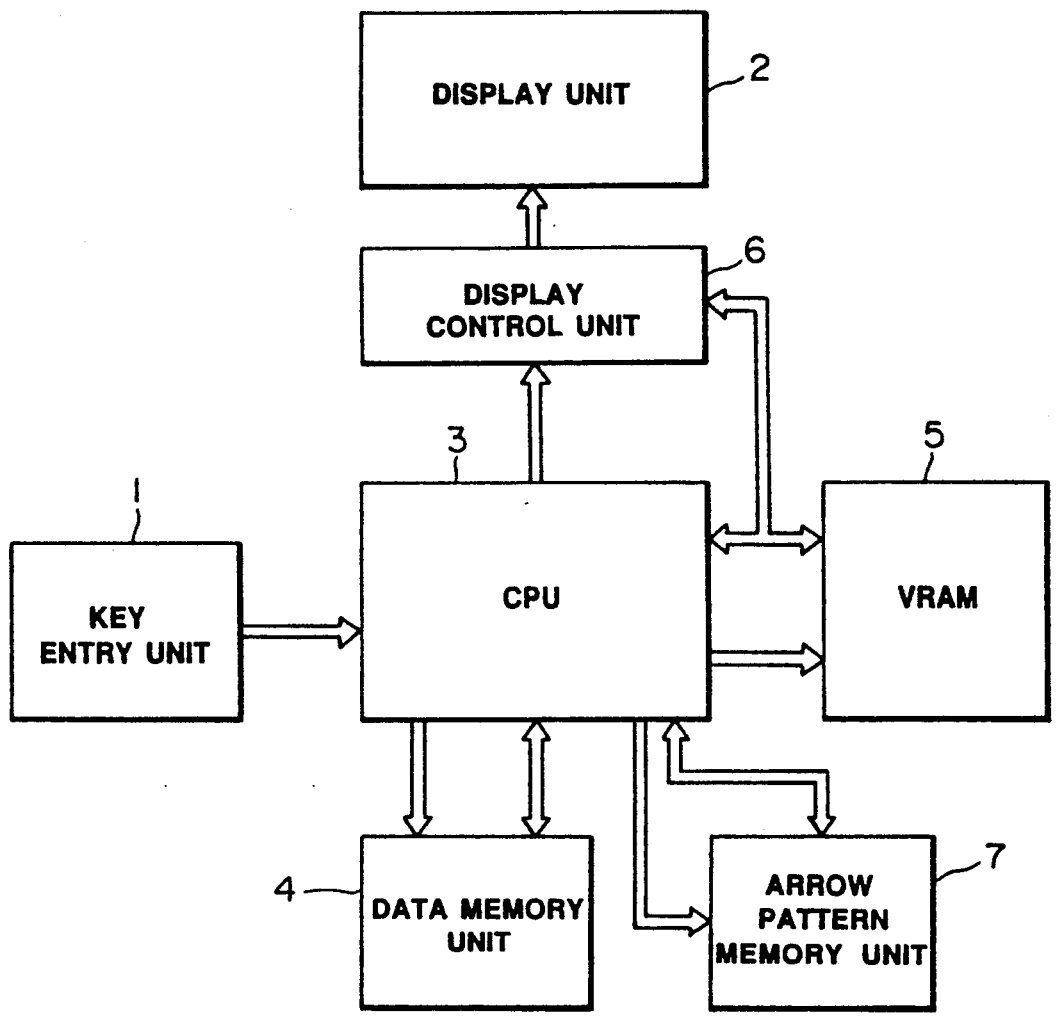
FIG. 2 is a schematic block diagram of an entire circuit of the financial calculator according to the preferred embodiment.

FIG. 2 is a block diagram of a circuit of the financial calculator 10 shown in FIG. 1. Input signals derived from various keys and switches of the key entry unit 1 are transferred to CPU (central processor unit) 3.

The functions of this CPU 3 are to control overall operations of the circuit of the financial calculator 10 in response to the input signals derived from the key entry unit 1, and to supply various control signals and data signals to a data memory unit 4, VRAM (visual data random access memory) 5, a display control unit 6 and an arrow pattern memory unit 7.

The data memory unit 4 is arranged by, for instance, RAM (random access memory), and is to store various data required for the financial calculation.

Memory Areas of Memories

Figure 3:
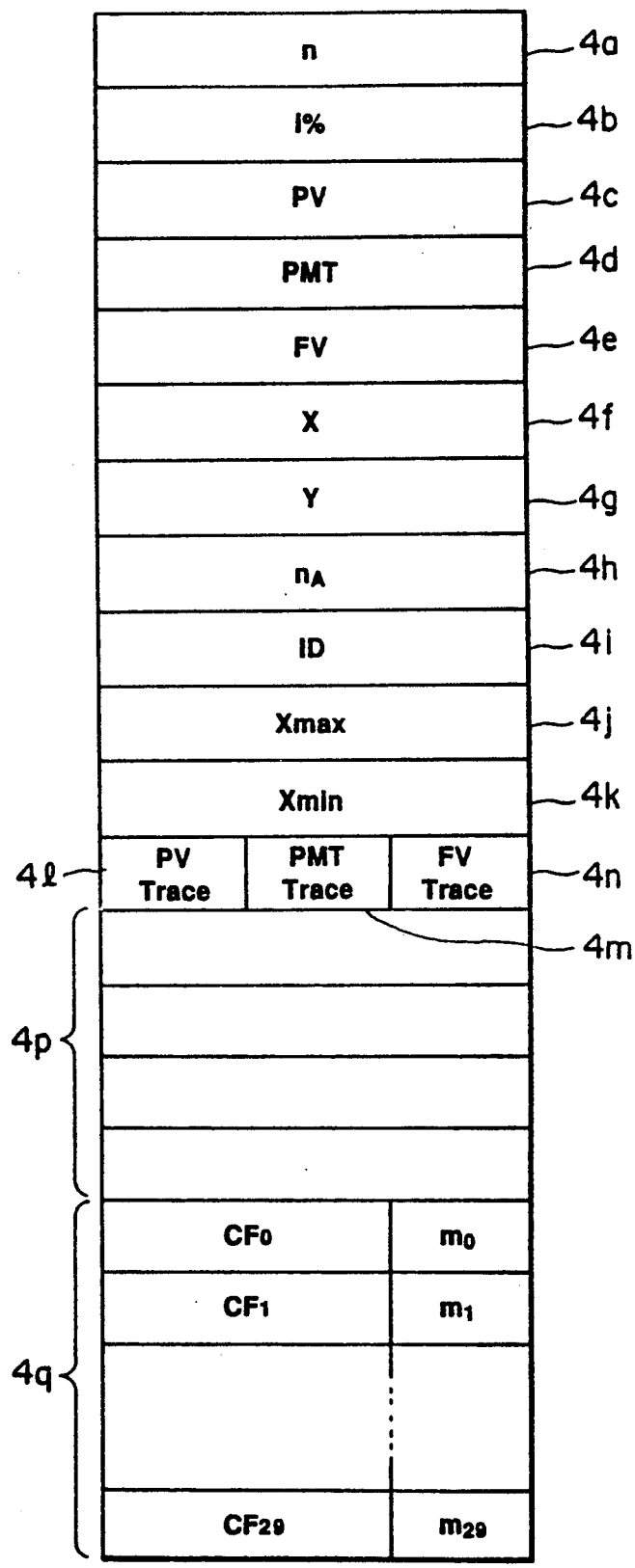
FIG. 3 schematically shows an internal arrangement of a data memory employed in the financial calculator shown in FIG. 1.

The data memory unit 4 is arranged by, for instance, RAM and stores various data required for the financial calculation. FIG. 3 schematically illustrates a data memory arrangement of this data memory unit 4. As shown in FIG. 3, the data memory unit 4 includes: an n register 4*a* for storing the number of term (payment numbers); and i % register 4*b* for storing an interest; a PV register 4*c* for storing a present value (PV); a PMT register 4*d* for storing a payment (PMT); a FV register 4*e* for storing a future value (FV); an X register 4*f* for storing a count value; a Y register 4*g* for storing interval data for producing a graphic representation; an nA register 4*h* for storing the number of a PMT arrow to be displayed; an ID register 4*i* for storing an address of the VRAM 5; an Xmax register 4*j* for storing a maximum range of a horizontal axis displayed on the display unit 2; and Xmin register 4*k* for storing a minimum range of the horizontal axis displayed on the display unit 2; a PV Trace register 4*l* for storing a tip address of the PV arrow; a PMT Trace register 4*m* for storing a tip address of the PVT arrow; and an FV Trace register 4*n* for storing a tip address of the FV arrow.

Furthermore, the data memory unit 4 includes a memory area 4*p* having a plurality of general-purpose registers; and a CF area 4*q* for storing cash flow (CF) data on the investment appraisal calculation.

Figures 4, 5:
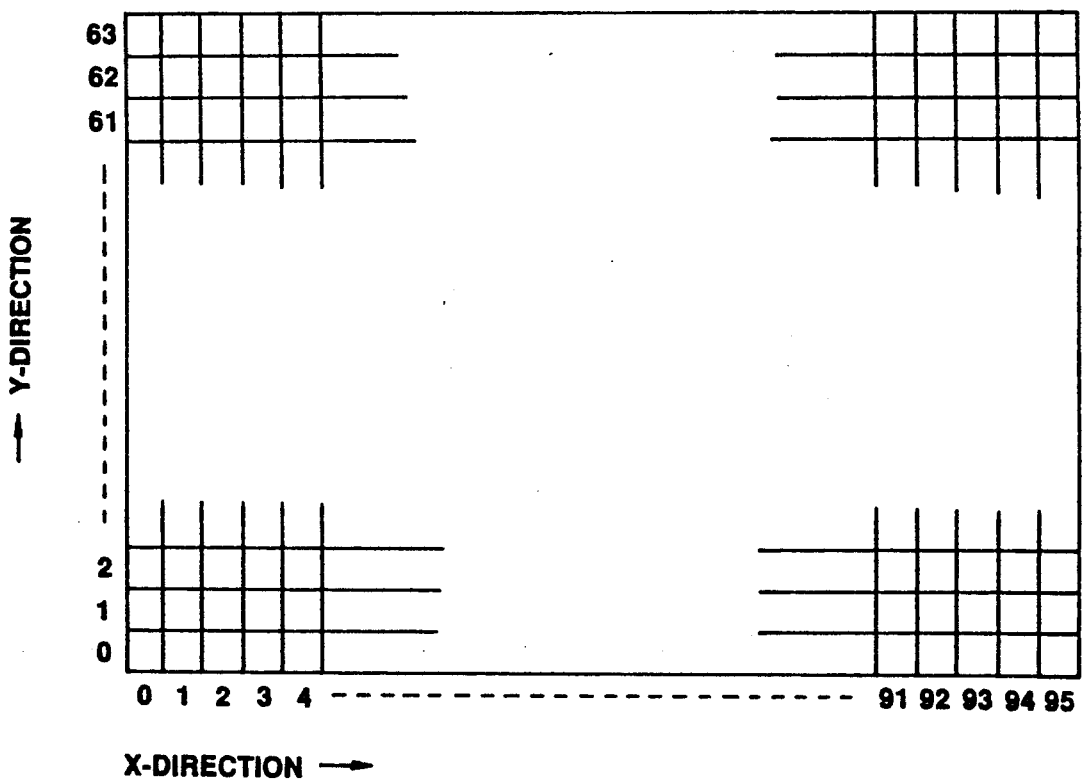
FIG. 4 schematically illustrates an internal arrangement of a register employed in the financial calculator.
FIG. 5 schematically indicates an internal arrangement of a VRAM used in the financial calculator.

FIG. 4 schematically illustrates a detailed data arrangement of the above-described PV register 4*c*, PMT register 4*d* and FV register 4*e*. Each of these registers includes 12-digit DATA unit for storing a numerical value; symbol flags PVs, PMTs, FVs for data representative of positive and negative symbols; order flags $PF_f$, $PMT_F$, $FV_F$ for storing an order of degrees of PV, PMT, and FV.

VRAM 5 stores display data to be displayed on the display unit 2. As shown in FIG. 5, VRAM 5 includes a memory area constructed of 96×64 bits corresponding to the matrix arrangement of the display unit 2. This VRAM 5 is addressed by the ID register 4*i* of the data memory unit 4.

The display control unit 6 outputs a display drive signal to the display unit 2 based upon the display data stored in VRAM 5, and causes the display data to be displayed on the display unit 2.

The arrow pattern memory unit 7 stores pattern data for representing arrows in accordance with the finance data of PV, FV, PMT, and is arranged by, for instance, ROM. FIG. 6 illustrates sorts of the arrow patterns stored in the arrow pattern memory unit 7. In total, 6 sorts of arrow patterns are prepared, i.e., short (S), medium (M) and long (L) arrows are prepared for PV, FV, PMT in the upper direction and lower direction. It should be noted that the direction of the arrow indicates a positive or negative symbol. The upper direction represents positive data whereas the lower direction indicates negative data. A length of the arrow represents a degree of the data.

Examples of the pattern data stored into the arrow pattern memory unit 7 are shown as follows. FIG. 7A indicates pattern data of the PMT arrow having an M size in the positive direction. FIG. 7B represents pattern data of the PMT arrow having an M size in the negative direction. This pattern data is arranged by 5×24 bits. The readout starting address of the pattern data is different in accordance with the arrow direction. That is to say, for the pattern data in the positive direction, the readout operation starts from the address "01, 01" toward the upper direction, whereas for the pattern data in the negative direction, the readout operation starts from the address "01, 24" toward the lower direction.

Operations of Financial Calculator

An operation of the financial calculator 10 will now be described.

As one example of the financial calculation, what is an amount with interest added (FV) under the following conditions: the principal (PV) is 100,000 yen, a payment of 10,000 yen is continued every year for 7 years, and a compound interest is selected to be 4% (i%) per year. It should be noted that the payment is made at the end of every year.

First, the MENU key 1*d* provided on the key entry unit 1 (see FIG. 2) is operated, the menus of the various financial calculation programs which have been stored in CPU 3 are sequentially displayed. The display screen shown in FIG. 8A is displayed on the display unit 2. In these displayed menus;

1. "SIMPLE INT" implies a simple interest calculation.

2. "COMPOUND INT" means a compound interest calculation 1 (yearly compound interest).

3. "COMP. INT. MONTHLY" indicates a compound interest calculation 2 (monthly compound interest).

4. "BOND" represents a bond calculation.

5. "D.C.F" denotes an investment appraisal calculation.

In the present example, the yearly compound interest calculation 1 is executed. The function key of F2 key 1J is operated so as to designate "2" among 1 to 5 numbers displayed at the lower-most column of the display unit 2. As a result, the calculation program of the compound interest calculation 1 is read out, and thus, as shown in FIG. 8B, the data entry screen is displayed. Under this condition, the respective key names such as "n", "i%"

"PV", "PMT", and "FV" are displayed in accordance with the function keys "F1" key to "F5" key on the lower-most column of the display screen. It should be noted that since the above-described calculation example employs the year-end payment, the mode switch 1c is moved to the "END" position.

Under this condition, the various financial data necessary for the compound interest calculation are entered as follows. First, as illustrated in FIG. 8C', "7" "F1" is operated and thus the numeral value "7" is entered as the number of payment "n" into the n register 4a designated by the "F1" key. Thereafter, "4" "F2" is operated and the numeral value "4" of the yearly interest "i%" is entered into the i% register 4b. Then, "−100000" "F3" is operated so as to enter the principal PV "−100000" into the PV register 4c. Finally, "−10000", "F4" is operated in order to input the payment amount PMT "−10000" into the PMT register 4d.

As a consequence, the contents of the respective registers are displayed in FIG. 8c.

Figures 8D, 8E, 8F:
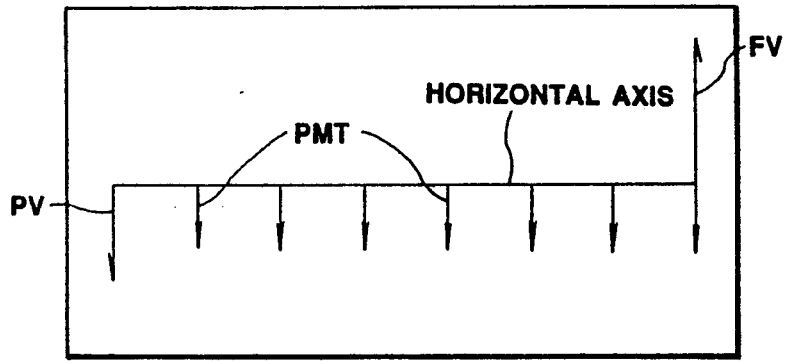

Then, in order to obtain the amount with interest added "FV", "COMP" "F5" is depressed to execute the calculation program of the compound interest calculation 1. CPU 3 reads out the memory contents of the registers 4a to 4d of the data memory 2 and perform the predetermined calculation. As a result, the data "170535" is stored into the FV register 4e. Then, as shown in FIG. 8D, the respective financial data containing the resultant data FV are displayed on the display unit 2.

To visually grasp the relationships between the cash payment and refund, and also the time elapse which is the major feature of the invention, the GRAPH key 1g is operated so as to display "a cash flow diagram". Then as illustrated in the flow chart of FIG. 9, the process to form a graphic representation of the compound calculation is performed. The "cash flow diagram" representing the principal PV, payment amount PMT and amount with interest added FV as the arrows are displayed on the display unit 2 as shown in FIG. 8E. It should be noted in FIG. 8E that the directions of the arrows indicate the payment and refund of the cash, the upper-directed arrow indicates the refund whereas the lower-directed arrow denotes the payment. The lengths of the arrows indicate the amount of the cash, and the number of the PMT arrows denote the number of the payment. The horizontal axis represents the overall term of the financial calculation.

Graphic Representations

Figure 9:
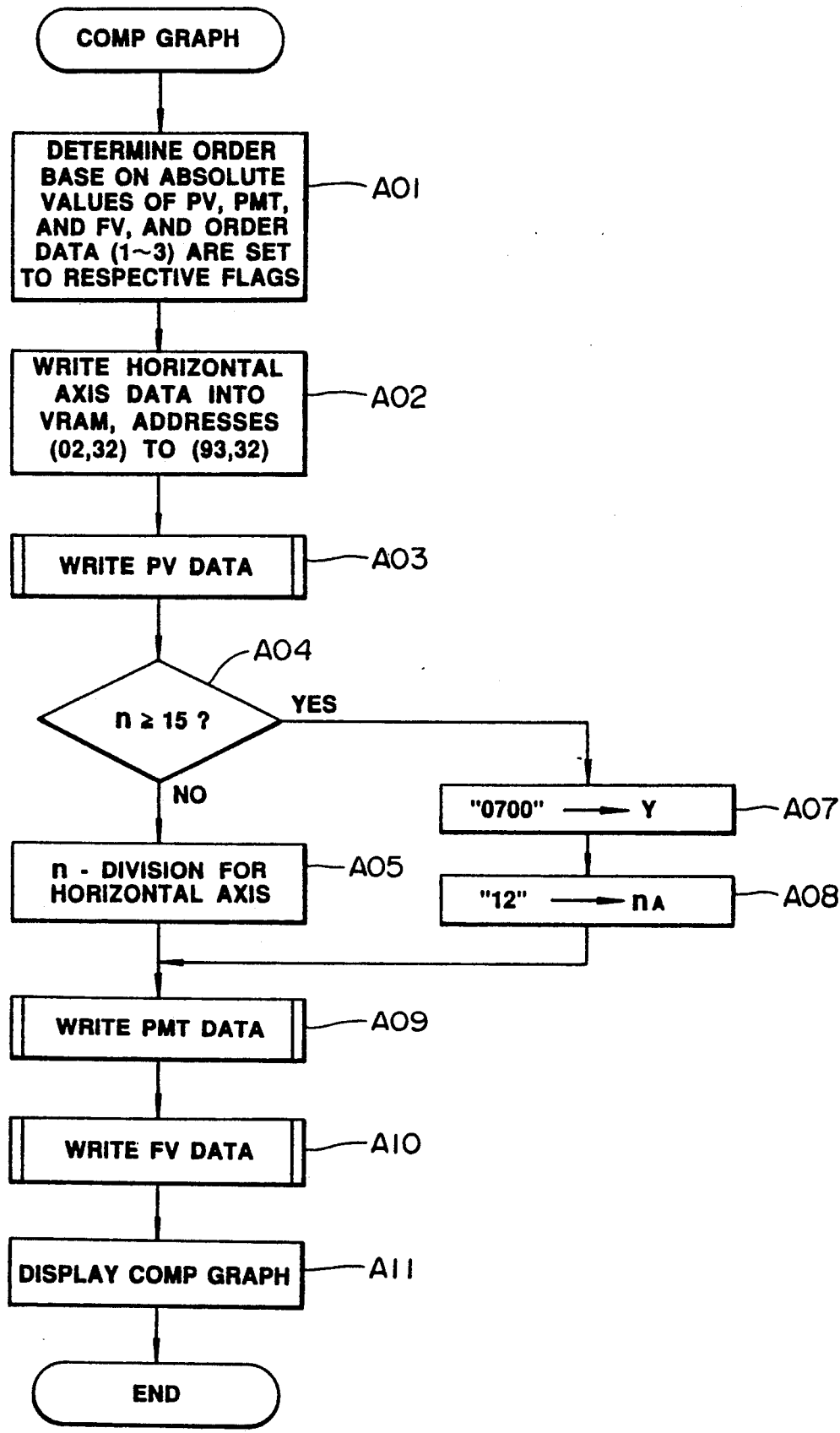
FIG. 9 is a major flow chart for explaining a graphic representation of the compound interest calculations.

Referring now to FIG. 9, the processing steps of representing financial data according to the invention will be described.

When the GRAPH key 1g is operated, a step A01 is executed. In this step A01, the absolute values of the respective financial data (PV, PMT, FV) which have been stored into the PV register 4c, PMT register 4d, and FV register 4e are compared with each other in CPU 3 so as to determine an order of these financial data. The order data 1 to 3 from the largest order to the smallest order are set to the order flags $PV_F$, $PMT_F$ and $FV_F$ of the respective registers 4c to 4e. In this case, since the order of the data is "FV, PV, PMT", 1 is set to the order flag $FV_F$, 2 is set to the order flag $PV_F$, and 3 is set to the order flag $PMT_F$. When the above-described step A01 is accomplished, the process is advanced to the next step A02.

In the step A02, the data for displaying the horizontal axis (X direction) in the cash flow diagram is written into VRAM 5. The display position of the horizontal axis is located at substantially the center of the display screen in the Y direction. To provide a space constructed of 2 dots at both ends of the horizontal axis, the address arrangement of VRAM 5 is selected to be from the address "02, 32" to the address "93, 32" as shown in FIG. 5. CPU 3 sequentially increments the ID register 4i from the address "02 32" to the address "93 32" in the X direction, and the bit data of "1" is written into VRAM 5.

Then, the subsequent step A03 is executed. In this step A03, to display the PV arrow on the display unit 2, the PV arrow pattern is written into VRAM 5. This write process of the PV arrow pattern will now be described with reference to the flow chart shown in FIG. 10.

Figure 10:
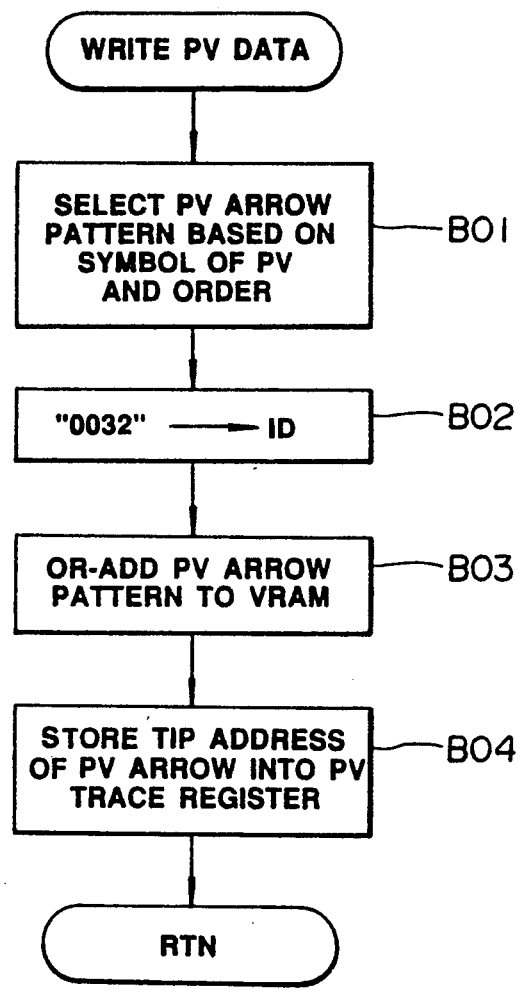
FIG. 10 is a flow chart of explaining a writing operation of PV arrow patterns.

In FIG. 10, CPU 3 reads out the data stored in the PV register 4c in a step B01, and selects the PV arrow pattern to be displayed based upon the symbol stored in the symbol flag $PV_S$ and the order stored in the order flag $PV_F$. In this case, since "1" representative of the negative data is stored into the symbol flag $PV_S$ and "2" is stored into the order flag $PV_F$, CPU 3 selects the M size of the PV arrow in the negative direction is selected from the pattern data stored in the arrow pattern memory unit 7.

Then, the process is advanced to a step B02, and CPU 3 writes "00 32" into the ID register 4i so as to access the address "00, 32" of the VRAM 5. When this step B02 process is accomplished, next step B03 is executed. In the step B03, the PV arrow pattern selected from the above-described step B01 is read out from the arrow pattern memory unit 7, and the writing process is sequentially performed from the address "00, 32" of VRAM 5 which is addressed by the ID register 4i. In this case, since the selected PV arrow pattern corresponds to the M size in the negative direction (the length of the arrow is 16 bits), CPU 3 sequentially reads out the pattern data of the arrow pattern memory unit 7 from the address "01, 24" to the lower-directed addresses "02, 24", "03, 24", "04, 24"; "05, 24"; and "01, 23" ... And also, while the ID register 4i is sequentially updated from "00, 32" to "01 32"; "02 32"; "03 32"; "04 32", "00 31" and "01 31" ..., the readout pattern data are OR-added in VRAM 5, and when the ID register 4i reaches "04 09", the process is completed.

Thereafter, the next step B04 is executed where the data are OR-added in VRAM 5. As a result, the tip address of the PV arrow written into VRAM 5 is stored into the PV Trace register 41 of the data memory unit 4.

When the process of the step B04 is accomplished, the process is returned to the process defined in the flow chart of FIG. 9, and therefore the step A04 is executed.

In the step A04, the content of the n register 4a for storing the number of term "n" is judged by CPU 3, so that CPU 3 judges whether or not the content of the n register 4a is less than 15. It should be understood that the reason why the numerical value of the number of term "n" is judged, is that there is a limitation in the number of the PMT arrows which can be displayed on the display unit 2 (14 arrows in the preferred embodiment). If a large-sized display unit 2 is employed, the number of the PMT arrows may be increased to more than 14. To the contrary, if a judgement is made "NO" in the step A04, n is less than 15, so that the process is advanced to a step A05, where the n-division process for the horizontal axis is performed as shown in FIG. 11 in detail.

In a first step C01 of the flow chart shown in FIG. 11, an address "02" of the X direction representative of the left-most end of the horizontal axis is written into the X-min register 4k. In the next step C02, an address "93" of the X direction indicative of the right-most end of the horizontal axis is written in the X-max register 4j.

Then, in a step C03, CPU 3 reads out the contents of the X-max register 4j, X-min register 4k and n register 4a so as to perform the following calculation: (X max−X min)/n. The calculation result is stored in the Y register 4g. As a consequence, the numerical value representative of the length of the horizontal axis which has been divided by "n" is stored in the Y register 4g. This content of the Y register 4g corresponds to the interval data for displaying the PMT arrow. In this case, the calculation is executed: (93−2)/7=13.0.

The process is advanced to a step C04, the content of the Y register 4g is made an integer by cutting 4 or less number and adding 5 or higher number for the first digit below the decimal point. Then, data having four digits is produced by setting this integer to the upper two digits and "00" to the lower two digits, and then written into the Y register 4g. In the result, Y register stores data "1300". The content of the Y register 4g corresponds to the data representative of the interval used when a plurality of PMT arrows are written into VRAM 5.

In the subsequent step C05, the content of the n register 4a is transferred to the nA register. The content of this nA register 4h corresponds to the number of the PMT arrows.

After this step C05 is accomplished, the process is returned to the flow chart shown in FIG. 9, and therefore a step A09 is executed.

It should be noted that if a judgement in the above-described step A04 is made YES (i.e., n≧15), the number of the PMT arrows is reduced to 12, and the processes defined by the steps A07 and A08 are performed so as to set the display interval of the PMT arrows to 7 dots.

The four digit number "0700" is written into the Y register 4g. As previously described, the content "0700" of this Y register 4g corresponds to the data representative of the display interval of the PMT arrow.

Thereafter, the step A08 is executed to write the numeral value "12" into the nA register 4h. The content "12" of this nA register 4h corresponds to the data representative of the number of the PMT arrows. After this step A08 is accomplished, the process is advanced to the next step A09.

Figure 12:
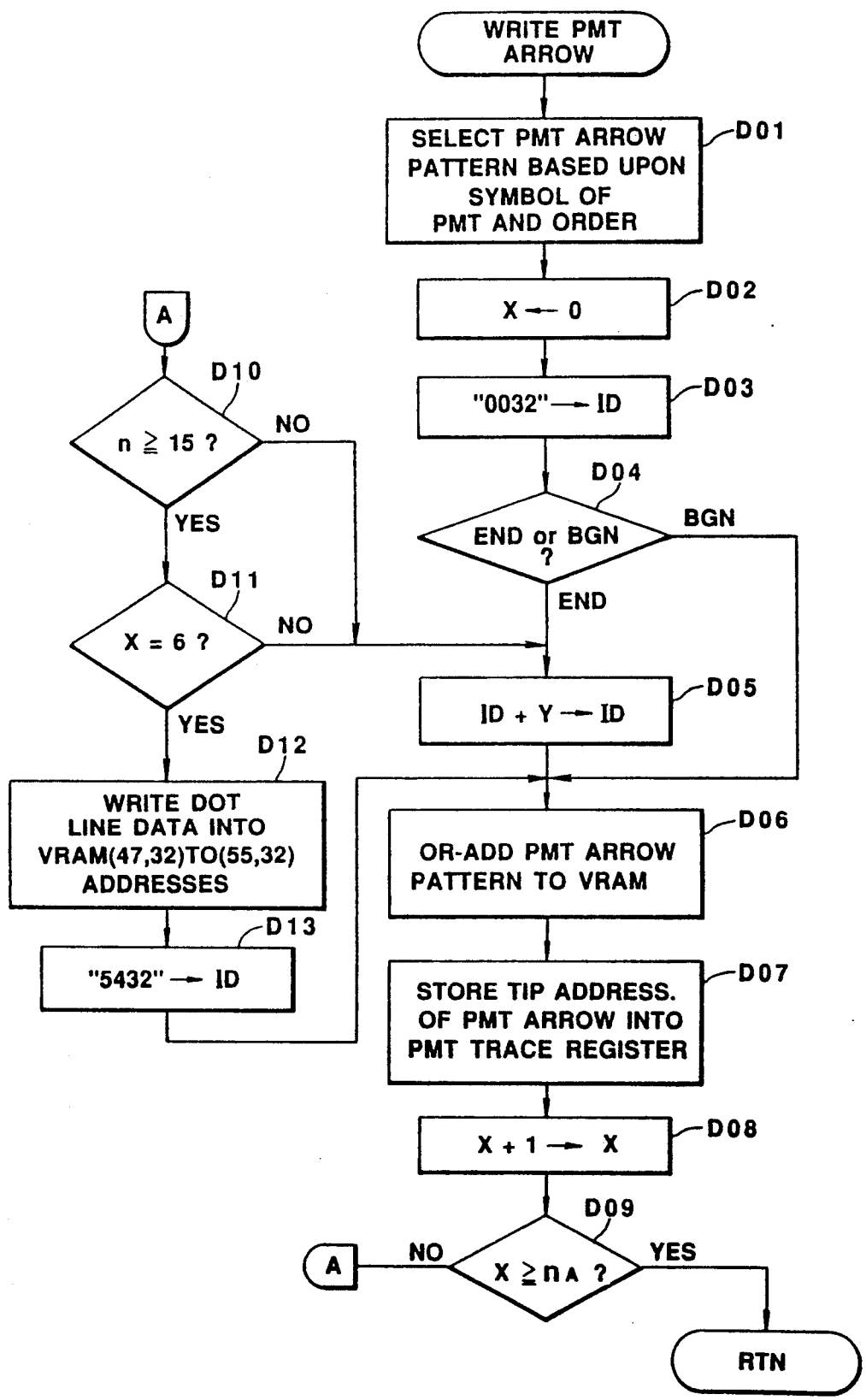
FIG. 12 is a flow chart of explaining a writing operation of PMT arrow patterns.

As illustrated in FIG. 12 in detail, in this step A09, to display the PMT arrow indicative of the payment amount PMT on the display unit 2, the PMT arrow pattern is written into VRAM 5.

In a step D01 shown in FIG. 12, CPU 3 reads out the content of the PMT register 4d, judges the contents of the symbol flag PMTs and order flag PMT$_F$, and selects the PMT arrow pattern to be displayed. In this case, the content of the symbol flag PMTs indicates the negative data, CPU 3 selects the "S size" of the PMT arrow in the negative direction from pattern data stored into the arrow pattern memory unit 7 since the content of the order flag PMT$_F$ corresponds to 3.

Then, the next step D02 is executed to clear the contents of the X register 4f. This X register 4f is used for writing the PMT arrow pattern into VRAM 5, as a counter for counting the number of the writing operation. After this step D02 is accomplished, the process is advanced to a step D03.

In this step D03, CPU 3 writes the numeral value "0032" into the ID register 4i and the reference address "00, 32" of the horizontal axis of VRAM 5 is designated.

In a step D04, CPU 3 judges whether or not the setting position of the mode switch 1d corresponds to either "END" or "BGN". In this case, since the above-described calculation example employs the year-end payment, the next step D05 is performed because the mode switch 1e has been set to the "END" position.

In the subsequent step D05, the content "1300" of the Y register 4g is added to the content "0032" of the ID register 4i, and the additive result is written into the ID register 4i.

When a judgement is made "BGN" in the above-described step D04, the process is jumped over a step D05 and advanced to another step D06.

In this step D06, the PMT arrow pattern selected from the above-described step D01 is read out from the arrow pattern memory unit 7, and the writing process is sequentially performed from "13, 32" address of VRAM 5 designated by ID register 4i. In this case, as the PMT arrow pattern selected corresponds to the S size in the negative direction (the length of the arrow is 8 dots), CPU 3 sequentially reads out the pattern data stored in the arrow pattern memory unit 7 from the address "01, 25" toward the lower-directed address, and also sequentially increments the ID register 4i from "1322" to "1432", "1532", "1632", "1732", "1331" and "1431". . . The readout pattern data are OR-added to VRAM5 and the process is accomplished when the ID register 4i reaches to "1709".

Thereafter, another step D07 is performed where the tip address of the PMT arrow which has been OR-added to VRAM 5 and written thereinto, is stored into the PMT Trace register 4m of the data memory unit 4.

It should be noted that no process defined by this step D07 is executed when the tip address has been stored into the PMT Trace register 4m. That is to say, in the step D07 after second process, no data is written into the PMT Trace register 4m. This is because only first one PMT arrow is traced in the below-mentioned trace process.

In a step D08, the content of the X register 4f is incremented by "1" to obtain "1". In the subsequent step D09, a judgement is made whether or not the content "1" of the X register 4f is higher than the content "7" of the nA register 4h. In this case, a judgement result is No. Then, the process is advanced to a step D10.

In a step D10, a judgement is made whether or not the content of the n register 4a is higher, than 15. In this case, since the content of the n register 4a corresponds to "7", a judgement result is No and then the process is returned to a step D05.

In this step D05, as previously described, the content "1300" of the Y register 4g is added to the content "1332" of the ID register 4i and the addition result "2632" is written into the ID register 4i.

In the subsequent step D06, the PMT arrow pattern is similarly, sequentially OR-added with the address "26, 32" of VRAM 5 as the writing starting address, and then the second PMT arrow data is written into VRAM 5.

In a step D07, since the tip address has been already written into the PMT Trace register 4m, the process is omitted and the process is advanced to a step D08. In the step D08, the content of the X register 4f is incremented by "1" to obtain "2", and the process judgement is made whether or not the content "2" of the X register 4f is higher than the content "7" of the nA register. In this case, the judgement result becomes NO and thus the process is advanced to a step D10. Similarly, until a judgement is made X=nA in the step D09, the processes defined by the steps D05 to D10 are repeated. That is to say, until the content of the X register 4f becomes "7", the above-described process is performed. At this time, the horizontal line, one PV arrow and seven PMT arrows have been written into VRAM 5. In this case, the content of the ID register 4i has become "9132".

Thus, when the judgement is made YES in the step D09, the process shown in FIG. 12 is accomplished and then the process is returned to the flow chart shown in FIG. 9.

It should be noted that in the calculation example where the number of term "n" is higher than 15, the judgement result of the above-described step D10 becomes YES, the process defined by the step D11 is executed. In this step D11, a judgement is made whether or not the content of the X register 4f corresponds to "6". If yes, then the process is advanced to the next step D12, whereas if no, the process is returned to the step D05. As a consequence, even in the calculation example where the number of term "n" is higher than 15, the same processes defined by the steps D05 to D11 are repeated until X=0 to 5, where 6 PMT arrows are written into VRAM 5. Then, if yes in the step D11, the process defined by the step D12 is executed.

In the step D12, in order to indicate that the PMT arrow is interruptedly displayed, the dot line data is written into VRAM 5 instead of the arrow consisting of 9-dot horizontal axis. In other words, CPU 3 causes the ID register 4i to be sequentially incremented by "4732", "4832", ---, "5432" and "5532", and outputs the bit data of "0" and "1" alternately and then written into VRAM 5.

When this step D12 is completed, the process is advanced to a step D13 where the numeral value "5432" is written into the ID register 4i. After the process defined by the step D13 is executed, the process is returned to the step D6., That is, in the step D06, the address "5432" which has been written into the ID register 4i by executing the step D13 is employed as the writing starting address, and the 7th PMT arrow is OR-added to VRAM 5 and then written thereto.

Similarly, until a judgement is made "X=nA" ("12" has been stored in this case), the processes defined by the step D05 to F11 are performed. The above-described flow chart operation is to explain the calculation example where the number of term "n" is higher than 15.

The process defined by the step A10 will now be described.

As shown in the flow chart of FIG. 13, to display the FV arrow on the display unit 2, the FV pattern is written in VRAM 5 in this step A10.

First, in a step E01, CPU 3 reads out the content of the FV register 4e, and judges both the contents of the symbol flag $FV_S$ and order flag $FV_F$ so as to select the FV arrow pattern to be displayed. In this case, the content of the symbol flag $FV_S$ corresponds to "0" indicative of the positive data, and the content of the order flag $FV_F$ corresponds to "1", so that CPU3 selects the "L" size of the FV arrow in the positive direction from the pattern data stored in the arrow pattern memory unit 7.

Then, the process defined by the step E02 is executed so as to judge whether or not the setting position of the mode switch 1c corresponds to either END or BGN. When the judgement result is BGN, the process is advanced to a step E03 where the numeral value "9132" is written into the ID register 4i. However, in this case, as the judgement is made END, the process defined by the step E04 is executed.

In the step E04, the FV arrow pattern selected from the above-described step E01 is read out from the arrow pattern memory unit 7, and the readout data are sequentially written into VRAM 5 which is addressed by the ID register 4i. This process is similar to the writing operation of the above-described PV.

Thereafter, the process defined by the subsequent step E05 is executed where the tip address of the FV arrow which has been written into VRAM 5 is stored into the FV Trace register 4n of the data memory unit 4.

When the process of the step E05 is accomplished, the process is returned to the step A11 of the flow chart shown in FIG. 9. In the step A11, the display data of the horizontal axis, PV arrow, PMT arrow and FV arrow are read out and displayed on the display unit 2. In this step A11, CPU 3 address-controls VRAM 5 so as to read the data and supplies the readout data to the display unit 6, and then outputs the various control signals for performing the display operation to the display control unit 6. Then, the display control unit 6 produces the display drive signal based upon the data supplied from VRAM 5 and drives the display unit 2.

As a result, as illustrated in FIG. 8E, the cash flow diagram corresponding to the compound interest calculation 1 is displayed on the display unit 2.

When the TRACE key 1h is operated, the trace operation is carried out. At first, the data are read out from the PV register 4c so that "PV = −100000" is displayed on the bottom-most column of the display screen of the display unit 2. Simultaneously, based upon the data from the PV Trace register 4l, the tip of the PV arrow is flickered and this arrow indicates "PV" (see FIG. 8F). Then, when this TRACE key 1h is again operated, the content of the PMT register 4d is written into VRAM 5, the content of the PMT register 4d is written into VRAM 5, so that the data "PMT = −10000" is displayed on the bottom-most column of the display screen of the display unit 2, and also the tip of the PMT arrow positioned at the left-most edge is flickered based on the content of the Trace register 4m.

Furthermore, when the TRACE key 1h is once operated, the content of the FV register 4e is written into VRAM 5, with the result that the data "FV=170 535" is displayed on the bottom-most column of the display screen of the display unit 2, and the tip of the FV arrow is flickered based upon the content of the FV Trace register 4n.

Other Financial Calculations

According to the financial calculator 10, shown in FIG. 1, of the invention, other financial calculations such as a simple interest calculation can be performed.

Figure 14:
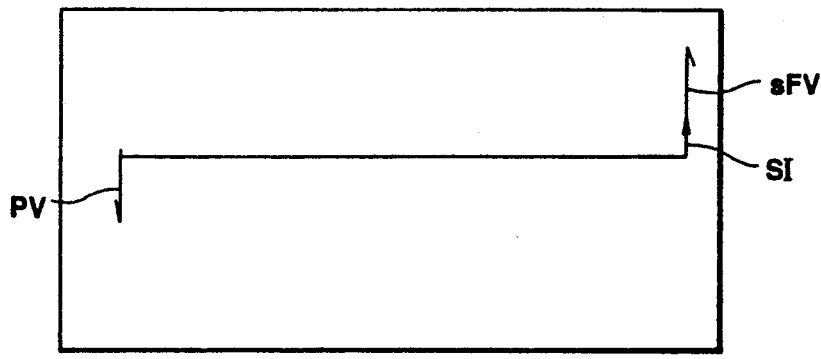
FIG. 14 represents a graphic display condition of a simple interest calculation.

When a simple interest calculation is carried out in the financial calculator 10, the F1 key 1i is operated under the display condition shown in FIG. 8A. In response to the F1 key operation, CPU 3 executes the simple calculation program, and requests entry of n (number of day), i% (yearly interest rate) and PV (principal) on the display screen of the display unit 2. Then, when the corresponding values are entered, both SI (interest) and SFV (amount with interest added) can be calculated. Thereafter, when the Graph key 1g is operated, the display as shown in FIG. 14 can be obtained.

Figure 15:
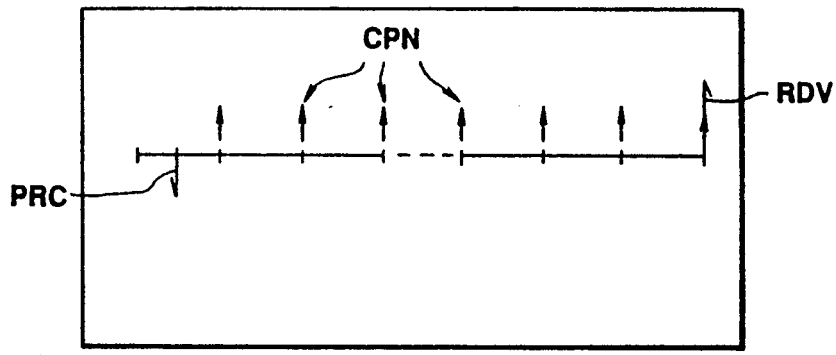
FIG. 15 represents a graphic display condition of a bond calculation.

When a bond calculation is performed, F4 key 11 is operated under the display condition shown in FIG. 8A. CPU 3 performs the bond calculation program. Accordingly, CPU 3 requests on the display screen "d1" (day of purchase), "d2" (day of redemption), "CPN" (annual coupon rate), and YLD (annual yield). Entering the required data can calculate PRC (price of face value). Then, the graphic representation shown in FIG. 15 can be obtained by operating the Graph key 1g. In this case, max. and min. in the X direction of the graphic representation indicate "d1" and "d2" respectively, the lengths of the arrows PRC, RDV and CPN are determined by the amounts thereof. The number of CPN utilizes the numerical value calculated by "d1" and "d2". If the number of "n" is great, the process similar to that used in the flow of the compound interest calculation is carried out. As illustrated in FIG. 15, the dot line is used for the display purpose.

Investment Appraisal Calculation

Referring now to FIGS. 16 to 23, an investment appraisal calculation will be described.

Figure 16:
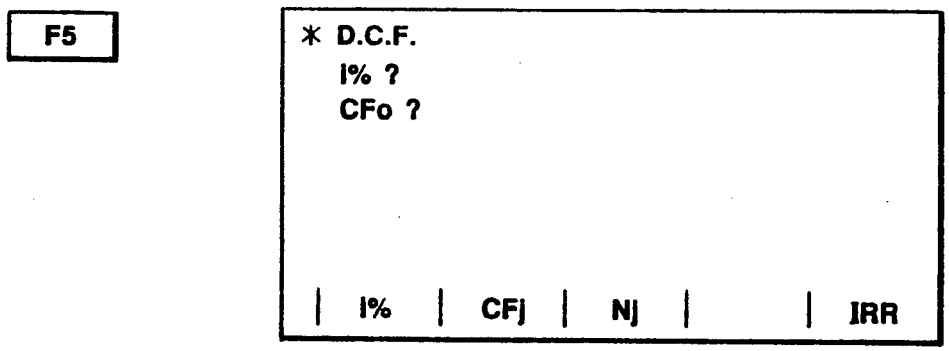
FIG. 16 represents a display of an initial condition on an investment appraisal calculation.

Under the display condition shown in FIG. 8A, when the F5 key 1m is operated, CPU 3 performs the investment appraisal program, and requests entry of CF data and i% on the display screen of the display unit 2 (see FIG. 16).

When i% data is entered for this request, this entered value is stored in the i% register 4b of the data memory unit 4. The CF data in which a plurality of values are continuously entered, are sequentially stored into the CF area 4q.

Based upon the entered data, NPV (net present value), NFV (net future value), IRP (internal rate of return) and PBP (payback period) can be obtained by program execution. When the Graph key 1g is operated, a flow of the CF data is displayed on the display unit 2.

Figure 17:
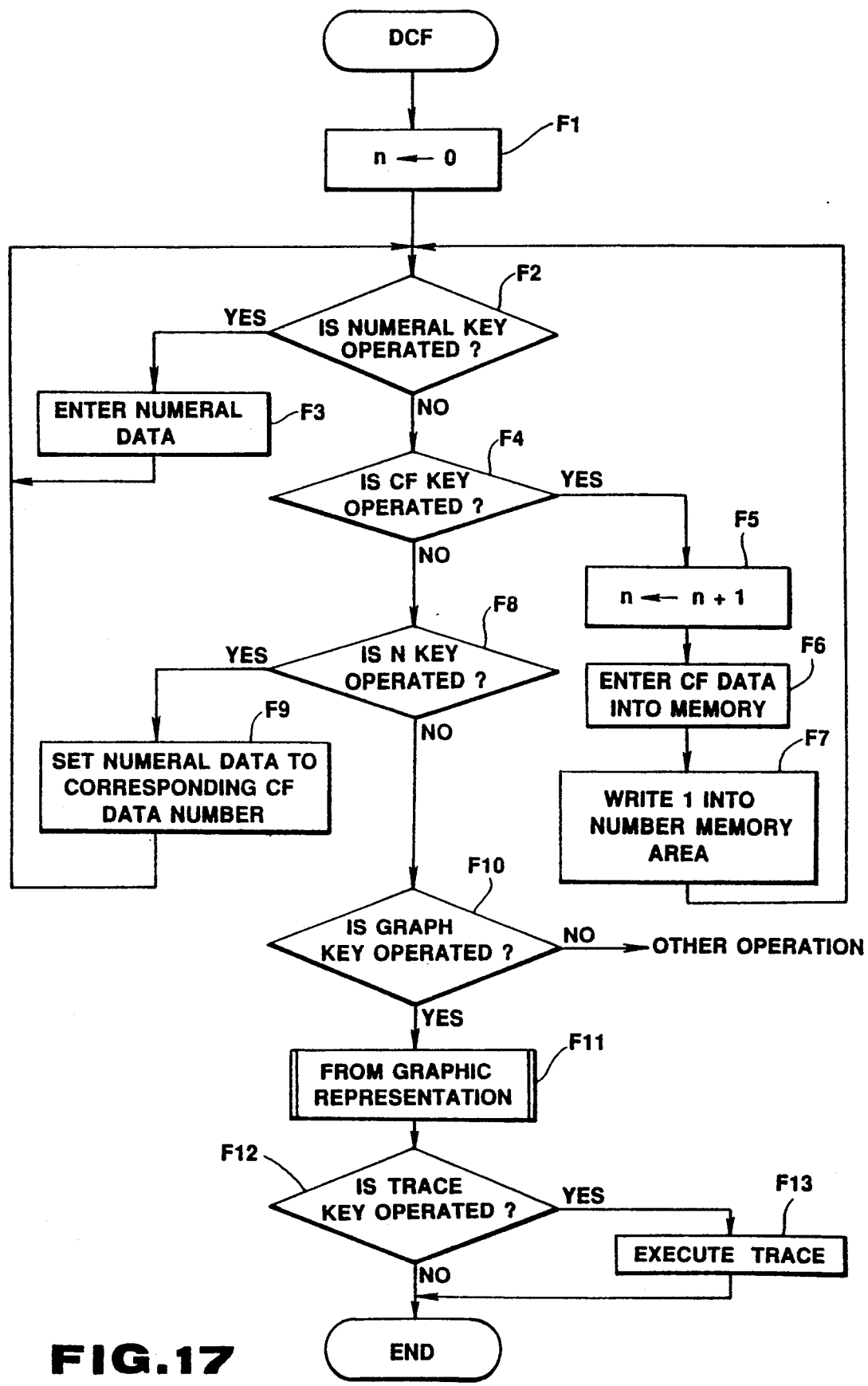
FIG. 17 is a flow chart for explaining the investment appraisal calculation.

Referring to the flow chart shown in FIG. 17, the investment appraisal calculation will be described.

When the financial calculator 10 is brought into the investment appraisal mode, the content "n" of the n register 4a is set to zero in a step F1.

Under this condition, the CF data are entered. First, the numeral data are input by operating the numeral key 1a. Then, a judgement result is Yes in step F2, and then the numeral input is performed in a step F3 and returned to the step F2.

Thereafter, when the F2 key 1j is operated, a judgement is made NO in the step F2 and the process is advanced to step F4. The operation of CF key makes judgement "Yes" in a step F4. The process is advanced to a step F5. In a step F5, the content "n" of the n register 4a is incremented by 1. Then, the process is advanced to a step F6, the numeral data of the CF data are written into the CFo of the CF area 4q, and "1" is written into the number memory area "mo" of the CF area 4q in a step F7, and thereafter the process is returned to the step F2.

Similarly, when the F2 key 1j is operated subsequent to the entry of the numeral data by the numeral key, the operations defined by the steps F1 to F7 are repeated, and the CF data are written into the CF area 4q.

When the CF data are continuously the same, the numeral data entry by the F2 key 1j is continuously followed by input of a number of the continuous numeral data, and thereafter the F3 key 1h is operated. Then, the number is entered in the steps F2 and F3, the process is advanced to the step F8. At this step F8, a judgement is made that the N key is operated. Then, the process is advanced to a further step A9. The numeral data are written into the m area corresponding to the CF data.

The content of the CF area 4q into which the CF data are written is shown in FIG. 18 as one example. In this case, $CF_o$ to $CF_6$ of the CF data are stored. The $CF_o$ and $CF_1$ data are payment data such as the investment which are stored by adding "−" symbol before the numeral data, and the refund data such as payback are written in the remaining $CF_2$ to $CF_6$. It should be noted that the $CF_3$ data represents two continuous data having the same value.

When the entry of the CF data have been accomplished, and the Graph key 1g of the key entry unit 1 is operated a judgement is made Yes in a step F10 and the process is advanced to a step F11 where the corresponding graphic representation is made.

In case of no operation of the Graph key 1g, other processes will be performed.

Figure 19:
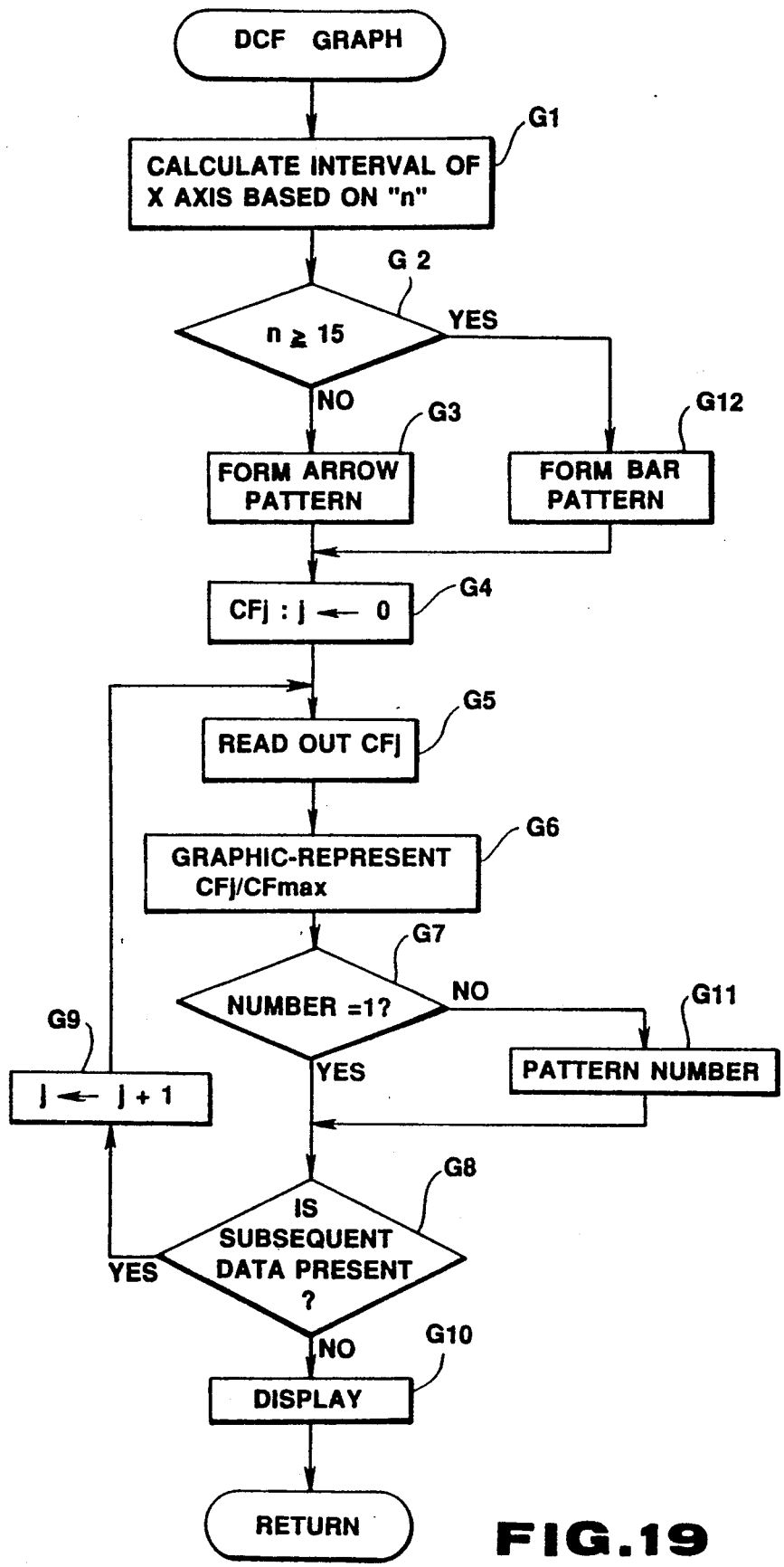
FIG. 19 is a flow chart of a graphic representation of the investment appraisal.

To form the graph defined in the step F11, a flow chart shown in FIG. 19 is executed. In first step G1, the intervals of the graphic representation is calculated based upon the content of the n register 4a. In this case, since the content n is 6, as previously described, the resultant interval is obtained by equally dividing the X axis into 6.

Then, in a step G2, a judgement is made whether or not $N \geq 15$. In the above case, since n=6, i.e., the judgement result is No, the process is advanced to a step G3 where a judgement is made that the data are displayed as the arrow pattern. Then, the process is advanced to a step G4. In this step G4, the first entry data of the CF data is designated. Thereafter, the $CF_O$ data designated in a step G5 is read out. Then, in the next step G6, the length of the arrow is calculated from the ratio of the readout data value of the $CF_O$ data to the maximum CF data CF max value among the written CF data, and the resultant value is written into VRAM 5 as the graphic representation data. Then, in a step G7, a judgement is made whether or not the number of the number memory area $m_o$ with respect to the $CF_O$ data corresponds to 1. In the preferred embodiment, this judgement result is Yes, so that the process is advanced to the next step S8 where another judgement is made whether or not there is the subsequent CF data. In the preferred embodiment, since the subsequent CF data is present, +1 is added in a step G9 and then the process is returned to the step G5.

Similarly, the entry values of $CF_1$ and $CF_2$ are read out, and the arrow pattern is written into VRAM 5. When the $CF_3$ data is read out, since the number memory area $m_3$ corresponds to 2, a judgement result is No in step G7. Then, the process is advanced to a step G11, at which the number is patterned. That is to say, since the number of the number memory area $m_3$ corresponds to 2, two pieces of the dot display data are written into the lower position of the CF$_3$ arrow pattern in VRAM 5.

Similarly as to the CF data until CF$_6$, the operations defined by the steps G5 to G9 are repeated, and the CF arrow pattern is written into VRAM 5. Then, in the step G8, a judgement is made that the subsequent CF data is not present. Thereafter, the process is advanced to the step G10 where the content of VRAM 5 is displayed on the display unit 2. This display condition is illustrated in FIG. 20. In this figure, two dots displayed under the arrow represents that the data representative of CF$_3$ is continued two times.

Under this condition, if the Trace key 1h is operated, the judgement result is Yes in the step F12. Then, the process is advanced to the step F13, where the CF$_0$ value is displayed on the bottom-most column of the display screen, and also the arrow of CF$_0$ is flickered. Thereafter, every time the Trace key 1h is operated, "j" of the CF$_j$ data is incremented by +1 and sequentially displayed on the display unit 2.

If a judgement is made that "n" is higher than 15 in the step G2 of the flow chart shown in FIG. 19, the process is advanced to the step G12. In this step, this CF data is represented by a bar pattern (see FIG. 21).

As has been described in detail, in the financial calculator of the invention, flows of the data obtained in the financial calculation, e.g., payment, refund, intervals between inputs and outputs of data, a magnitude of data can be displayed as graphic representations by which the financial data can be readily, visually grasped. Also according to the financial calculator of the invention, this calculator can be utilized to obtain simulation calculations of the financial data, which produces practical merits for a to an user.

What is claimed is:

1. A graphic representation apparatus having a matrix type display screen, comprising:
    storing means for storing data to be displayed;
    representing means for converting said data stored in said storing means into graphic patterns, and for graphically representing said data to be displayed by said graphic patterns;
    detecting means for detecting an uninterrupted sequence of the same patterns to be displayed on said display screen;
    omitting means for omitting a selected number of patterns from the uninterrupted sequence detected by said detecting means and for indicating on said display screen that such omission has been made.

2. A graphic representation apparatus as claimed in claim 1, wherein:
    said detecting means includes means for detecting a sequence of more than three of the same patterns; and
    said omitting means includes means for indicating an omitted portion of said sequence by a dotted line.

3. A graphic representation apparatus as claimed in claim 2, wherein said data to be displayed correspond to PV (present value), PMT (payment) and FV (future value) data used in a compound interest calculation, and a portion of a sequence of patterns representing said PMT data is omitted by said omitting means.

4. A graphic representation apparatus as claimed in claim 2, wherein said data to be displayed correspond to PRC, CPN, and RDV data used in an investment appraisal, and a portion of a sequence of patterns representing said CPN data is omitted by said omitting means.

5. A graphic representation apparatus as claimed in claim 1, wherein:
    said detecting means includes means for detecting a sequence of more than two of the same patterns; and
    said omitting means includes:
        means for omitting all except one of said same patterns for which said detecting means detects said sequence; and
        means for adding a symbol to said one remaining pattern to indicate the omitted patterns.

6. A graphic representation apparatus as claimed in claim 5, wherein said added symbol is displayed on the display screen as a dot pattern, and the number of dots in said dot pattern represents the number of omitted patterns.

7. A graphic representation apparatus having a matrix type display screen, comprising;
    means for storing a number of data items to be displayed; and
    means for graphically representing the stored data items;
    said graphically representing means including:
    pattern storing means for storing a plurality of graphic patterns;
    pattern selecting means for selecting one of the stored graphic patterns automatically based upon the number of said data items to be displayed; and
    means for determining a length of the selected pattern based upon a value of the stored data.

8. A graphic representation apparatus as claimed in claim 7, wherein:
    said pattern storing means includes means for storing an arrow pattern and a bar pattern; and
    said pattern selecting means includes:
    means for selecting the arrow pattern when the number of said data items is lower than a predetermined number; and
    means for selecting the bar pattern when the number of said data items is higher than a predetermined number.

9. A graphic representation apparatus as claimed in claim 8, wherein said data items to be displayed correspond to CF (cash flow) data used in an investment appraisal calculation.

* * * * *